Patented May 29, 1951

2,555,286

UNITED STATES PATENT OFFICE 2,555,286

POLYMERIZATION OF VINYL ACETATE IN GRANULAR FORM

Charles L. Boyce, Springfield, Mass., assignor to Shawinigan Resins Corporation, Springfield, Mass., a corporation of Massachusetts No Drawing. Application December 31, 1947, Serial No. 795,119

3 Claims. (Cl. 260—89.1)

This invention relates to the preparation of polyvinyl acetate in granular form.

The polymerization of vinyl acetate in aqueous suspension in the presence of a protective colloid has been suggested. Among the protective colloids which have been used are polyvinyl alcohols. However, it has been discovered that polyvinyl alcohols which are partial hydrolysis products of polyvinyl acetate cannot be used indiscriminately in preparing granular polymers.

It is an object of this invention to prepare polyvinyl acetate in granular form.

It is a particular object of this invention to provide a process for the suspension polymerization of vinyl acetate in the presence of partially hydrolyzed polyvinyl acetate whereby a granular product is obtained that may be easily separated from the aqueous phase of the polymerization charge.

These and other objects are attained according to this invention by subjecting an aqueous suspension of vinyl acetate to polymerization conditions in the presence of a mixture of partially hydrolyzed polyvinyl acetates, one of which is derived from polyvinyl acetate having a viscosity of 40-80 centipoises at 20° C. in a 1-molar benzene solution and contains 5-20% acetate groups by weight calculated as polyvinyl acetate and the other is derived from a polyvinyl acetate having a viscosity of 2-15 centipoises at 20° C. in a 1-molar benzene solution and contains 40-50% acetate groups by weight calculated as polyvinyl acetate. For purposes of convenience, the first type of partially hydrolyzed polyvinyl acetate mentioned above will be hereinafter designated as A-type colloid and the second type as B-type colloid.

The following example is illustrative of the present invention but is not to be construed as limitative thereof. Where parts are mentioned, they are parts by weight.

Example 0.10 part of partially hydrolyzed polyvinyl acetate derived from polyvinyl acetate having a viscosity of 60 centipoises at 20° C. in a 1-molar benzene solution and containing 10% acetate groups by weight calculated as polyvinyl acetate and 0.02 part of partially hydrolyzed polyvinyl acetate derived from polyvinyl acetate having a viscosity of 7 centipoises at 20° C. in a 1-molar benzene solution and containing 42% acetate groups by weight calculated as polyvinyl acetate are dissolved in 150 parts of warm water contained in suitable vessel equipped with an agitator and water-cooled return condenser. After cooling the resulting solution to room temperature, 0.01 part of hydrogen peroxide and 0.04 part of sodium bicarbonate are added. To the resulting mixture are added with vigorous agitation 150 parts of freshly distilled vinyl acetate and the reaction mixture is heated to its reflux temperature at atmospheric pressure and the heating and agitation continued at its reflux temperature until a temperature of 85–90° C. is obtained and no further refluxing occurs. On cooling the product, it is found to contain a slurry of polymer granules having an average diameter of 0.5–1.0 mm. and comprising slightly flattened spheres and ovals. The granules are easily recovered from the aqueous phase by screening or centrifuging.

In contrast to the process described in the example, when an attempt is made to repeat the process, except that the protective colloid is made up entirely of the partially hydrolyzed polyvinyl acetate derived from polyvinyl acetate of 7 centipoise viscosity, the polymer is obtained in the form of a gelatinous mass and regardless of variation in the speed of agitation or concentration of the protective colloid, granules are not obtained.

In further contrast to the process described in the example, if the protective colloid is made up solely of the partially hydrolyzed polyvinyl acetate derived from polyvinyl acetate of 60 centipoises viscosity, it is found that the polymer granules are exceedingly fine in size, averaging 0.1 mm. diameter and are difficult to separate from the aqueous phase due to the fine size.

From the foregoing, it is seen that the use of the B-type colloid greatly improves the action of the A-type colloid particularly in that coarser particles are obtained. This result is entirely unexpected since the B-type colloid per se is entirely ineffective as a suspending agent.

A further advantage in the process of the invention resides in the fact that coarse beads may be obtained even when high rates of polymerization are induced. Thus, when relatively large amounts of catalyst are used to promote a rapid polymerization, it is necessary to use relatively large amounts of colloid to prevent agglomeration of the polymer particles. The result of the use of large amounts of A-type colloid is the production of small polymer particles which are difficult to separate from the suspending medium. However, by the inclusion of the B-type colloid along with the A-type colloid, coarse beads are obtained which are easily separated from the suspending medium even though sufficient catalyst is used to promote a rapid reaction, i. e., polymerization of 95% or more of the vinyl acetate in not over 4 hours at reflux temperature at atmospheric pressure.

Another advantage in the use of a mixture of A-type and B-type colloids is that a more rapid rate of reflux is permissible without agglomeration of the polymer particles. Thus, much less stringent control of the polymerization conditions is required.

As indicated hereinbefore, the A-type colloid may be derived from polyvinyl acetate having a viscosity of 40–80 centipoises at 20° C. in a 1-molar benzene solution and in particular the colloids are preferred which are derived from polyvinyl acetates having a viscosity of 55–65 centipoises at 20° C. in a 1-molar benzene solution. The acetate content of the A-type colloid may vary from 5 to 20% acetate groups by weight calculated as polyvinyl acetate. A more preferred group are those in which the acetate content is 8–12%.

While the amount of the A-type colloid which is used depends upon the amount of catalyst and other reaction conditions, it is usually found that 0.01–0.5 part for every 100 parts of water and preferably 0.05 to 0.2 part is suitable.

The B-type colloid is derived from polyvinyl acetate having a viscosity of 2–15, preferably 5–10, centipoises in a 1-molar benzene solution at 20° C. The acetate content of this colloid ranges between 40 and 50% acetate groups by weight calculated as polyvinyl acetate. The amount of this colloid may also vary to a substantial extent depending upon other reaction conditions but is generally somewhat less than the amount of the A-type colloid. Thus, it is usually found that the use of 0.001–0.1 part and preferably 0.01–0.05 part of this colloid for every 100 parts of water may be used.

In order to promote the polymerization, any of the well known peroxide catalysts may be used in place of hydrogen peroxide, such as benzoyl peroxide, acetyl peroxide, lauryl peroxide, urea peroxide, potassium persulfate, sodium perborate and the like. The amount of catalyst is such as to promote a fairly vigorous reaction at the selected temperature. Usually the amount used is such as to cause substantially all, i. e., 95% or more, of the vinyl acetate to polymerize in from ½ to 8 hours. In terms of available oxygen, it is usually found that such an amount of peroxide may be used as to supply 0.001 to 0.1 part of available oxygen for every 100 parts of water.

When hydrogen peroxide or an hydrogen peroxide-generating substance, e. g., urea peroxide is used as a catalyst, it is found that a somewhat more smooth and uniform reaction occurs if an alkaline material is included in the reaction mixture. Thus, as illustrated in the example, it is desirable to include 0.01–1 part of a mild alkali such as sodium or potassium bicarbonate, sodium or potassium acetate, etc., in the reaction mixture. This expedient is well known to those skilled in the art and has been pointed out in prior patents. When other peroxides are employed, it is not necessary to include any alkaline material.

The polymerization is usually carried out at the reflux temperature of the reaction mixture at atmospheric pressure. Initially this temperature is about the boiling point of vinyl acetate and gradually increases as the polymerization continues. Usually heating is continued until substantially all of the vinyl acetate is polymerized. By carrying out the polymerization under varying pressures, the polymerization temperature may be varied from that obtained when the reaction is carried out at reflux at atmospheric pressure. Thus, by carrying out the polymerization in the absence of reflux or under partial vacuum, temperatures as low as 30° C. may be used. Conversely, by employing a closed system, polymerization temperatures as high as 100–150° C. or more may be used.

The relative proportions of vinyl acetate and water in the polymerization charge may be substantially varied. For purposes of economy, it is usually desirable to polymerize at least 10 parts of vinyl acetate for every 100 parts of water. On the other hand, in order to avoid a reaction mixture which becomes too viscous to readily agitate as the polymerization continues, it is not usually desirable to employ more than 150 parts of vinyl acetate for every 100 parts of water.

It is obvious that many variations may be made in the products and processes of this invention without departing from the spirit and scope thereof as defined in the appended claims.

What is claimed is:

1. A process for preparing polyvinyl acetate in granular form which comprises admixing 100 parts of water, 10–150 parts of vinyl acetate, a dispersing agent consisting of 0.01–0.5 part of a polyvinyl alcohol derived from a polyvinyl acetate having a viscosity of 40–80 centipoises in a 1-molar benzene solution at 20° C. and containing 5–20% acetate groups by weight calculated as polyvinyl acetate and 0.001–0.1 part of a polyvinyl alcohol derived from a polyvinyl acetate having a viscosity of 2–15 centipoises in a 1-molar benzene solution at 20° C. and containing 40–50% acetate groups calculated as polyvinyl acetate, and a peroxide catalyst, heating and agitating the resulting mixture to polymerize the vinyl acetate and recovering the resulting granular polyvinyl acetate.

2. A process as defined in claim 1 in which 0.05–0.2 part of the low acetate polyvinyl alcohol and 0.01–0.05 part of the high acetate polyvinyl alcohol are used.

3. A process as defined in claim 2 in which the low acetate polyvinyl alcohol is derived from a polyvinyl acetate having a viscosity of 55–65 centipoises and contains 8–12% acetate groups and the high acetate polyvinyl alcohol is derived from a polyvinyl acetate having a viscosity of 5–10 centipoises.

CHARLES L. BOYCE.

REFERENCES CITED

The following references are of record in the file of this patent:

UNITED STATES PATENTS

| Number | Name | Date |
|---|---|---|
| 2,194,354 | Crawford | Mar. 19, 1940 |
| 2,279,436 | Berg | Apr. 14, 1942 |
| 2,388,600 | Collins | Nov. 6, 1945 |
| 2,388,602 | Kiar | Nov. 6, 1945 |